United States Patent [19]

Humpolik et al.

[11] Patent Number: 5,366,700
[45] Date of Patent: Nov. 22, 1994

[54] APPARATUS FOR CATALYTICALLY DECONTAMINATING EXHAUST GASES AND METHOD FOR PRODUCING THE APPARATUS

[75] Inventors: Bohumil Humpolik, Ludwigsburg; Jürgen Bayer, Esslingen, both of Germany

[73] Assignee: Emitec Gesellschaft fuer Emissionstechnologie mbH, Lohmar, Germany

[21] Appl. No.: 138,342

[22] Filed: Oct. 18, 1993

[30] Foreign Application Priority Data

Apr. 16, 1991 [DE] Germany ............... 4112354

[51] Int. Cl.$^5$ ............................ B01J 32/00
[52] U.S. Cl. ......................... 422/180; 422/177; 60/299; 502/527; 502/439
[58] Field of Search .......... 422/180, 177; 60/299; 502/439, 527

[56] References Cited

U.S. PATENT DOCUMENTS

| | | | |
|---|---|---|---|
| 4,767,740 | 8/1988 | Abthoff et al. | 502/439 |
| 4,803,189 | 2/1989 | Swars | 502/439 |
| 4,832,998 | 5/1989 | Cyron | 428/116 |
| 4,923,109 | 5/1990 | Cyron | 422/180 |
| 4,946,822 | 8/1990 | Swars | 502/527 |
| 5,070,694 | 12/1991 | Whittenberger | 60/300 |

FOREIGN PATENT DOCUMENTS 2720322 11/1978 Germany.
2727967 1/1979 Germany.

*Primary Examiner*—Robert J. Warden
*Assistant Examiner*—Hien Tran
*Attorney, Agent, or Firm*—Herbert L. Lerner; Laurence A. Greenberg

[57] ABSTRACT

An apparatus for catalytically decontaminating exhaust gases, preferably for motor vehicle engines, includes a metal carrier body having a plurality of corrugated, or smooth and corrugated, sheet metal layers. The sheet metal layers have smooth end segments overlapping one another and being disposed as an outer layer on the periphery of the metal carrier body. A jacket encompasses the metal carrier body. At least one weld seam may connect the smooth end segments to one another and to the jacket. A mechanical retaining device may form-lockingly secure the metal carrier body in the axial direction in the jacket while engaging an end surface of the outer layer. A method for producing the apparatus includes initially coating individual corrugated, or smooth and corrugated, sheet metal layers of a metal carrier body with a wash coat, except for uncoated regions of lengthened smooth end segments of the sheet metal layers overlapping one another and being disposed as an outer layer on the periphery of the metal carrier body. The sheet metal layers are intertwined and inserted into a jacket encompassing the metal carrier body. The sheets are simultaneously connected to one another and to the jacket in the uncoated regions of the lengthened, smooth end segments resting on one another with at least one weld seam.

12 Claims, 4 Drawing Sheets

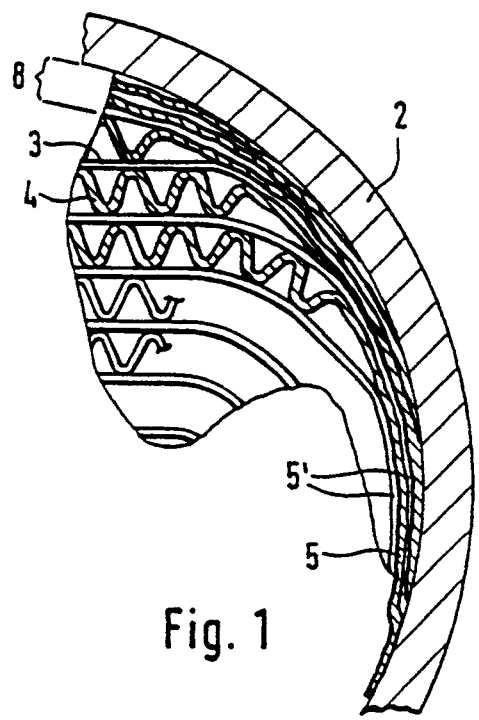
Fig. 1  Fig. 2
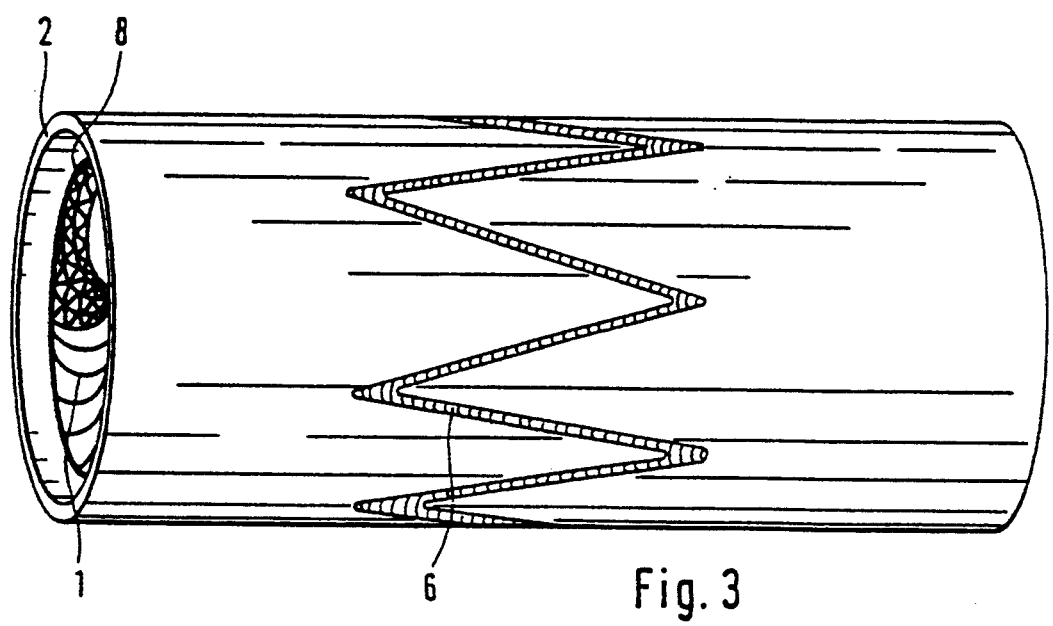
Fig. 3

APPARATUS FOR CATALYTICALLY DECONTAMINATING EXHAUST GASES AND METHOD FOR PRODUCING THE APPARATUS

CROSS-REFERENCE TO RELATED APPLICATION

This application is a Continuation of International Application Serial No. PCT/EP92/00796, filed Apr. 8, 1992.

BACKGROUND OF THE INVENTION

FIELD OF THE INVENTION

The invention relates to an apparatus for catalytically decontaminating or detoxifying exhaust gases, particularly for motor vehicle engines, having a metal carrier body including a plurality of layers of corrugated, or smooth and corrugated, sheet metal, and a jacket that encompasses the metal carrier body and is connected to it by welding techniques.

It is known from German Published, Non-Prosecuted Application DE-OS 27 20 322 to weld metal foils of a metal catalytic converter with electron beams. The individual layers of sheet metal are welded together in such a way that the metal catalytic converter is joined to make an intrinsically rigid insert. The insert is secured in a housing, for instance once again by electron beam welding.

It is known from German Published, Non-Prosecuted Application DE-OS 27 27 967 (which is a continuation of German Published, Non-Prosecuted Application DE-OS 27 20 322) to produce the metal catalytic converter by means of laser welding.

It is known from Published European Application No. 0 245 737 A1, corresponding to U.S. Pat. Nos. 4,803,189; 4,832,998; 4,923,109; and 4,946,822, to form honeycomb bodies of corrugated and smooth sheet metal layers in such a way that the corrugated sheets have straight sections on their ends which extend approximately centrally between the adjoining smooth sheets. The ends of the corrugated sheets must not touch the ends of the smooth sheets and they each rest individually on an encompassing jacket or casing tube, with which they are joined by joining techniques.

A disadvantage of the above-mentioned structures is that very thin metal foils (0.05 mm, for instance) are joined, particularly welded, to a housing that is multiple times thicker. In order to achieve a durable connection between the metal catalytic converter and the housing, the welding depth of an electron or laser beam must be adjusted very precisely, because otherwise the welded connection between the housing and the metal catalytic converter becomes unstable, or else the outer foil layer of the metal catalytic converter will be cut apart.

SUMMARY OF THE INVENTION

It is accordingly an object of the invention to provide an apparatus for catalytically decontaminating exhaust gases, which overcomes the hereinafore-mentioned disadvantages of the heretofore-known devices of this general type and which has a metal carrier body with a honeycomb body which can be axially fixed simply and durably in a jacket, and in particular can be welded in place.

With the foregoing and other objects in view there is provided, in accordance with the invention, an apparatus for catalytically decontaminating exhaust gases, preferably for motor vehicle engines, comprising a metal carrier body having a periphery and having a plurality of corrugated, or smooth and corrugated, sheet metal layers at least some of which being corrugated, the sheet metal layers having smooth end segments overlapping one another and being disposed as an outer layer on the periphery of the metal carrier body; a jacket encompassing the metal carrier body; and at least one weld seam simultaneously connecting or joining the smooth end segments to one another and to the jacket.

In accordance with another feature of the invention, the outer layer is between 0.5 mm and 2 mm thick.

The proposed embodiment enables secure joining of the metal carrier body to the jacket. The outer layer of the metal carrier body, which is formed of overlapping smooth end segments of the corrugated, or corrugated and smooth, sheet metal layers, brings about an accumulation of material at the periphery of the metal carrier body that permits simple welding of the metal carrier body to the jacket. The smooth end segments of the sheets are approximately identical in length. Due to their uniform distribution over the periphery, they are spaced uniformly apart from one another where they penetrate the outer layer of the metal carrier body, from which they extend radially outward and finally come to an end at the surrounding jacket. This assures that each sheet metal layer is joined directly to the jacket. The thickness of the outer layer is selected in such a way that it is greater than the wall thickness of the surrounding jacket.

In accordance with a further feature of the invention, the outer layer of the metal carrier body is welded to the jacket through the jacket. The welding depth for such through welding through the jacket into the outer layer of the metal carrier body is adjusted in such a way that the welding penetrates radially inward to approximately two-thirds of the thickness of the outer layer. If the welding depth fluctuates, an adequate tolerance range still remains, so that the outer layer of the metal carrier body is welded to the jacket if the welding depth is less, but is not cut through if the welding depth is greater.

In accordance with an added feature of the invention, the at least one weld seam is a laser weld seam. The welding process is not limited to laser or electron beam welding. Other welding processes, such as TIG (tungsten inert gas) or arc welding, can be used, although by laser welding to produce a weld seam, an especially advantageous and in particular fast production option is afforded.

In accordance with an additional feature of the invention, the outer layer of the metal carrier body has an end surface on which the jacket is welded. Once again, the great material thickness of the outer layer is especially advantageous. For example, it is possible for the metal carrier body to be welded to the jacket on its end-surface lines of contact by means of a fillet weld, if the jacket protrudes, and by means of a V seam, if the jacket ends flush with it. Any familiar methods may used as the welding process.

In accordance with yet another feature of the invention, the outer layer has end surfaces being peeled away from the metal carrier body, or being pushed away from the metal carrier body by deformation, forming a collar-like rim and the collar-like rim is welded to the jacket. In this case the outer layer of the metal carrier body is peeled off outward in collar-like fashion, producing an outwardly protruding rim that ends at the end surface of the jacket and is joined to it by welding, for instance spot or TIG welding. At the same time, a tube, cone or the like on the end opposite the jacket, may be welded jointly to the collar-like rim and the jacket.

With the objects of the invention in view, there is also provided an apparatus for catalytically decontaminating or cleaning exhaust gases, preferably for motor vehicle engines, comprising a metal carrier body having a periphery and having a plurality of corrugated, or corrugated and smooth, sheet metal layers, the sheet metal layers having smooth end segments overlapping one another and being disposed as an outer layer on the periphery of the metal carrier body, the outer layer having an end surface; a jacket encompassing the metal carrier body; and mechanical retaining means form-lockingly securing the metal carrier body in the axial direction in the jacket and engaging the end surface of the outer layer.

Since these retaining means engage the outer layer at the end surface, the retaining forces that must be brought to bear for fixing the metal carrier body in the jacket are transmitted to all of the sheet metal plies of the outer layer. Since the smooth end segments on the periphery of the metal carrier body overlap without any notable gap between them, the pressure per unit of surface area that results from the retaining forces is markedly reduced as compared with conventionally produced apparatuses for exhaust gas cleaning.

The mechanical retaining means may be constructed in various ways. For instance, a supporting ring for supporting the metal carrier body can be inserted into the jacket and welded, brazed or press-fitted into it. The mechanical retaining means may also be achieved by drawing-in the jacket or stamping retaining tabs out of the jacket upstream of the end surfaces of the metal carrier body. Depending on the conditions of use, it is possible to combine these and other options. An embodiment of the mechanical retaining means in the form of converging or diverging cones, which are typically mounted upstream and downstream of an apparatus for exhaust gas cleaning, is especially advantageous. In this case the cones may be constructed in such a way that their outside diameter matches the inside diameter of the jacket of the exhaust gas cleaning apparatus. They are inserted into the jacket and joined to it, preferably by welding, whereupon the end surfaces of the cones rest on the end surfaces of the metal carrier body in the region of the outer layer.

With the objects of the invention in view, there is additionally provided a method for producing an apparatus for catalytically decontaminating exhaust gases, preferably for motor vehicle engines, which comprises initially coating individual corrugated, or smooth and corrugated, sheet metal layers of a metal carrier body with a wash coat, except for uncoated regions of lengthened smooth end segments of the sheet metal layers overlapping one another and being disposed as an outer layer on the periphery of the metal carrier body; intertwining the sheet metal layers and inserting the intertwined sheet metal layers into a jacket encompassing the metal carrier body; and simultaneously connecting the sheets to one another and to the jacket in the uncoated regions of the lengthened, smooth end segments resting on one another with at least one weld seam.

In this case, coated, corrugated, or corrugated and smooth, sheet metal layers are used, having smooth end segments which are uncoated in a region that is layer to be welded to the jacket. The coating, such as a wash coat, is applied to the semifinished product prior to further processing to make the exhaust gas cleaning apparatus. A smooth end segment of the sheets is either shielded, so that an uncoated region remains there, or else the entire sheet is coated, and the region is subsequently freed of the coating by a chemical or mechanical process. Mechanical removal of the coating could be performed by brushing the end segments with bristles, for instance.

In this method, it is especially advantageous that the finished metal carrier body need not be coated afterward, but rather is already assembled from coated sheets. This results in a uniform distribution of the coating on the corrugated and smooth sheet metal layers, and in particular accumulations of material, which in the case of subsequent coating develop in the corners between the lines of contact of the corrugations of the corrugated sheets with the smooth sheets, are avoided. In the exhaust gas cleaning apparatus, the effective surface area is greater and the pressure drop is less as a result.

The invention as defined by the features and steps recited above can advantageously be employed for carrier bodies of the kind in which a plurality of plies extend from the inside outward, or in other words in accordance with German Patent DE 40 16 276 C1 or Published European Application No. 0 245 736 A1, for instance.

Other features which are considered as characteristic for the invention are set forth in the appended claims.

Although the invention is illustrated and described herein as embodied in an apparatus for catalytically decontaminating exhaust gases and a method for producing the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is an enlarged, fragmentary, diagrammatic view of a portion I of FIG. 2 with smooth end segments at a jacket;

FIG. 2 is a plan view of a metal carrier body in the jacket;

FIG. 3 is a perspective view of a metal carrier body in the jacket with an encompassing zig-zag weld seam;

DESCRIPTION OF THE PREFERRED EMBODIMENTS

Figure 4:
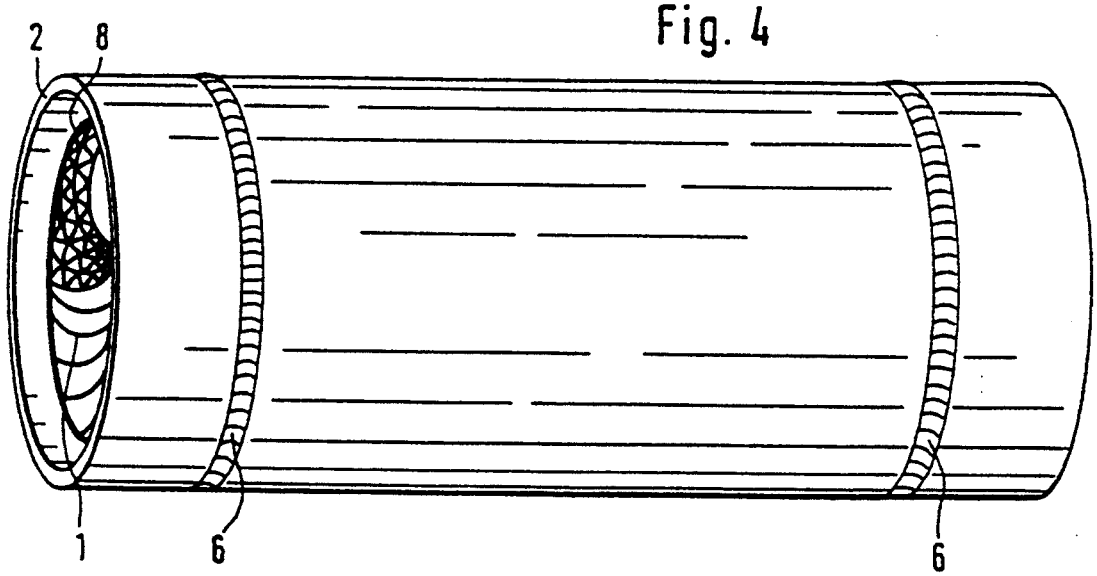
FIG. 4 is a view similar to FIG. 3 of a metal carrier body in the jacket with two weld seams encompassing it in a straight line.

Referring now to the figures of the drawing in detail and first, particularly, to FIG. 1 thereof, there is seen a portion of the apparatus according to the invention. Corrugated sheet metal layers 4 are provided with smooth end segments 5. These end segments 5 are stacked in alternation with smooth end segments 5' of sheet metal layers 3 that are smooth or are provided with corrugations, such as microcorrugations, to make an outer layer 8 of a metal carrier body 1 that is seen overall in FIG. 2. The end segments 5, 5' are of approximately equal length, so that on the condition of an introduction of the smooth end segments 5, 5' into the outer layer 8 with the introduction being distributed uniformly over the periphery of the metal carrier body 1, each end segment 5, 5' comes into contact with a surrounding jacket or casing 2 and can be welded to it. Lengthening the smooth end segments 5, 5' brings about an increase in thickness of the outer layer 8, because as a result the number of smooth end segments 5, 5', which are stacked at the same time into the outer layer 8 at one point along the periphery of the metal carrier body 1, increases.

The smooth end segments 5, 5' conform very well to the encompassing jacket 2, so that no voids of significant size remain at the points where one of the end segments 5, 5' ends and the end segment 5', 5 located below it comes into contact with the jacket 2. Due to the intrinsic tension of the sheets 3, 4, the outer layer 8 is pressed against the enveloping jacket 2. Therefore, there is no need for additional securing provisions for retaining the metal carrier body 1 in the jacket 2 prior to the welding.

FIG. 2 shows a preferred embodiment of an apparatus for exhaust gas cleaning, which contains the metal carrier body 1 of the invention that is shown on a larger scale in FIG. 1. In this case, four stacks of stacked sheets 3, 4 with smooth end segments 5 are placed crosswise against one another and are intertwined together in the same direction to form a round metal carrier body 1. In the process, the outer layer 8 is formed by the stacking of the smooth end segments 5, 5'. The metal carrier body 1 is inserted into the jacket 2 and welded to it. The spring force of the sheets 3, 4 has the effect of not requiring the sheets 3, 4 of the metal carrier body 1 to be joined to one another by joining techniques.

FIG. 3 shows a variant embodiment of the apparatus. The metal carrier body 1 of FIG. 3 is inserted into a tubular jacket 2. The outer layer 8 of the metal carrier body 1 is welded to the jacket 2 through the jacket 2. A weld seam 6 extends in zig-zag fashion over the periphery of the jacket 2. The weld seam 6 may be produced by laser welding, for instance. To that end, the tubular jacket 2 that is equipped with the metal carrier body 1 is set into rotation about its longitudinal axis, for instance, and is moved into a laser beam that executes an oscillating motion in the direction of the motion of the longitudinal axis of the jacket 2. The energy of the laser beam brings about through welding of the jacket 2 all the way into the outer layer 8.

FIG. 4 shows a further variant of the apparatus. In this case the metal carrier body 1 is joined to the jacket 2 by two weld seams 6 extending around the periphery in a straight line. The weld seams 6 are produced by TIG (tungsten inert gas) welding. For instance, the apparatus is set into rotation about its longitudinal axis and put into contact with two TIG welding electrodes.

Figure 5:
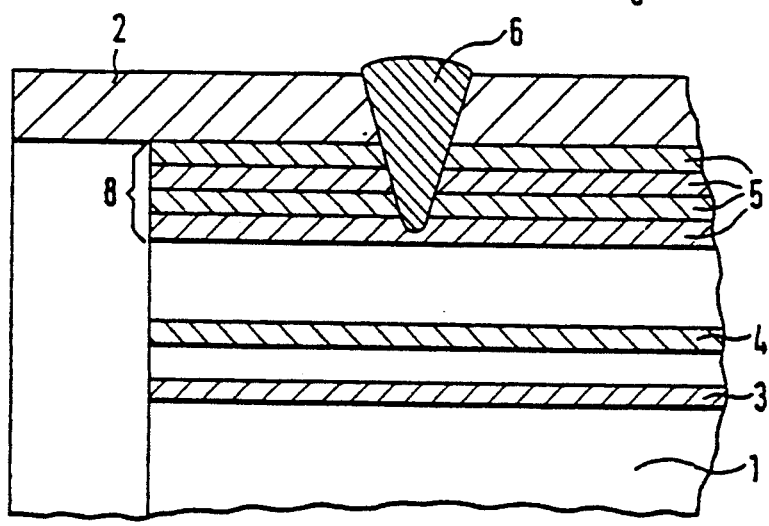
FIG. 5 is a fragmentary, sectional view through a metal carrier body and a jacket with through-welding in the jacket and an outer layer.

FIG. 5 shows a section through the jacket 2, the metal carrier body 1 with its outer layer 8, and a weld seam 6. The weld seam 6 is produced by through welding. The weld seam 6 extends through the jacket 2 as far as entering into the outer layer 8 and fixes the smooth ends 5, 5' of the sheets 3, 4 to the jacket 2. At least two smooth end segments 5, 5' are always welded to the jacket 2 in that case.

Figure 6:
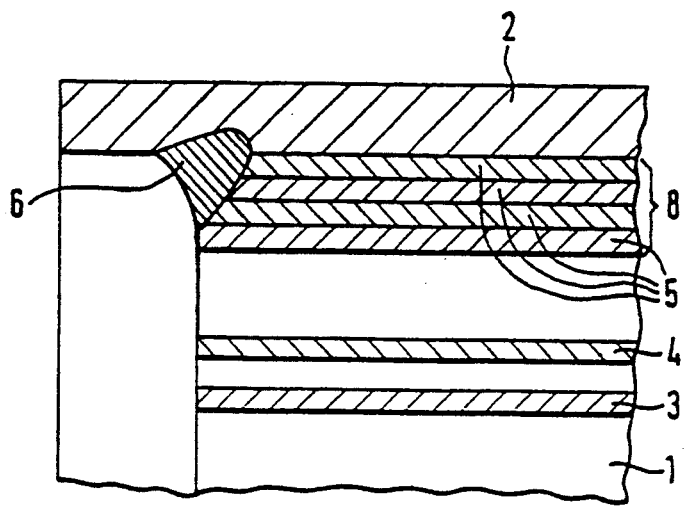
FIG. 6 is a fragmentary, sectional view through the metal carrier body and the jacket with a fillet weld at the jacket and the outer layer.

FIG. 6 shows a section through an apparatus in accordance with another embodiment of the invention. The jacket 2 protrudes past the metal carrier body 1, so that the weld seam 6 can be placed in the form of a throat groove in the corner that results at the end surface of the metal carrier body 1 and the inner wall of the jacket 2. The weld seam 6 is made in such a way that the outer layer 8 of the metal carrier body 1 is welded to the jacket 2. The weld seam 6 can be produced by an arbitrary welding method, for instance by electrowelding or laser welding.

FIG. 7 again shows a section through an apparatus in accordance with a similar embodiment of the invention. In this case, however, the metal carrier body 1 and the jacket 2 are flush at their end surfaces. Thus a weld seam 6 in the form of a U-shaped or V-shaped groove can be simultaneously welded from the end surface vertically into the jacket 2 and the outer layer 8 of the metal carrier body 1. Once again, the welding method is arbitrary.

Figure 7:
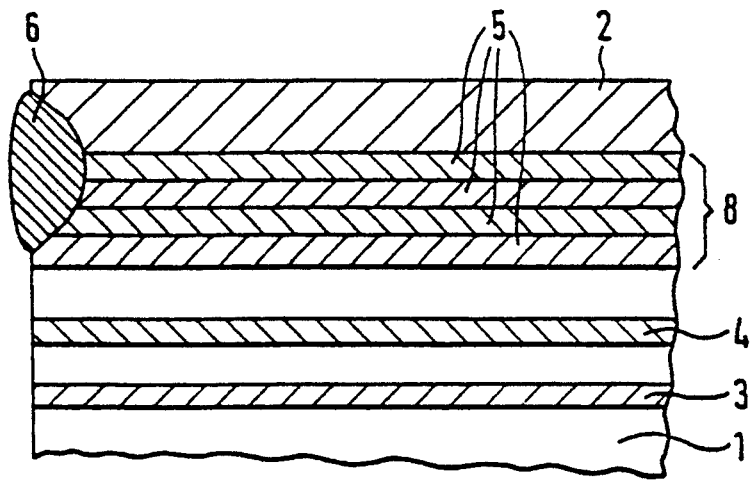
FIG. 7 is a fragmentary, sectional view through the metal carrier body and the jacket with an end-surface weld seam at the jacket and the outer layer.

The width of the weld seam 6 with which an apparatus of this embodiment is welded will be selected in such a way that it is narrower than the thickness of the outer layer 8 and the jacket 2 taken together, as is shown in FIGS. 6 and 7.

Figure 8:
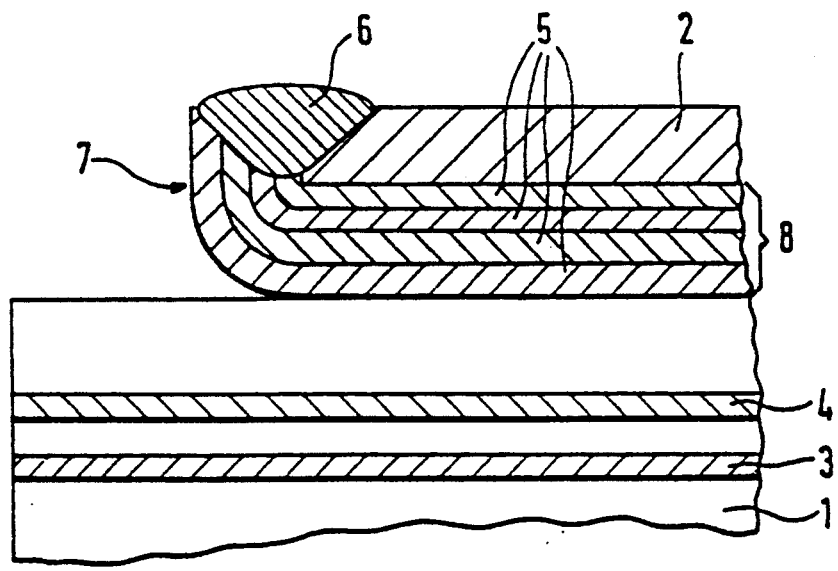
FIG. 8 is a fragmentary, sectional view through the metal carrier body and the jacket with a collar-like rim and an encompassing weld seam on the jacket and the collar-like rim.

FIG. 8 shows a section through a further embodiment of the invention. The outer layer 8 is peeled off from the metal carrier body 1 on the outside in collar-like fashion in the end-surface region and then rests on the end surface of the jacket 2. The outer layer 8 is welded to the jacket 2, with welding being performed on the end surface into the outer layer 8 in the region of a collar-like rim 7 and on the periphery into the jacket 2. The collar-like rim 7 is cut away from the metal carrier body by a suitable tool and at the same time is bent outward or merely bent outward in a shaping manner. In particular, the tool may be the electrode of a spot welding unit, and the weld seam 6 may be produced during the peeling or deforming process by means of spot welding. The connection between the metal carrier body 1 and the jacket 2 from outside the jacket is performed in a material-locking or integral and a form-locking manner. A form-locking connection is one which connects two elements together due to the shape of the elements themselves, as opposed to a force-locking connection, which locks the elements together by force external to the elements.

Figure 9:
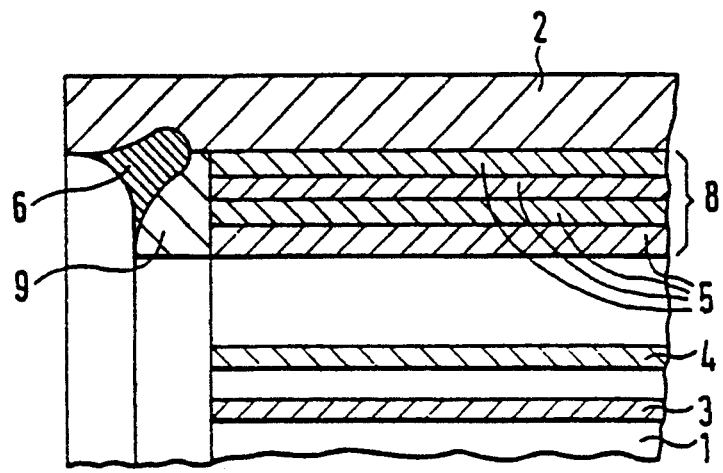
FIG. 9 is a fragmentary, sectional view through the metal carrier body and the jacket with mechanical retaining means.

In FIG. 9, a section is shown through an apparatus for exhaust gas cleaning in accordance with an additional embodiment of the invention. In this case the metal carrier body 1 is inserted into the jacket 2. The smooth end segments 5 of the smooth and corrugated sheets 3, 4 form the outer layer 8. Mechanical retaining means 9 in the form of a tubular segment is inserted into the jacket 2. The mechanical retaining means 9 rest on the end surface of the metal carrier body 1 in the region of the outer layer 8 and are joined to the jacket by an end-surface weld seam 6. The metal carrier body 1 is form-lockingly fixed in the jacket 2 in the axial direction.

Figure 10:
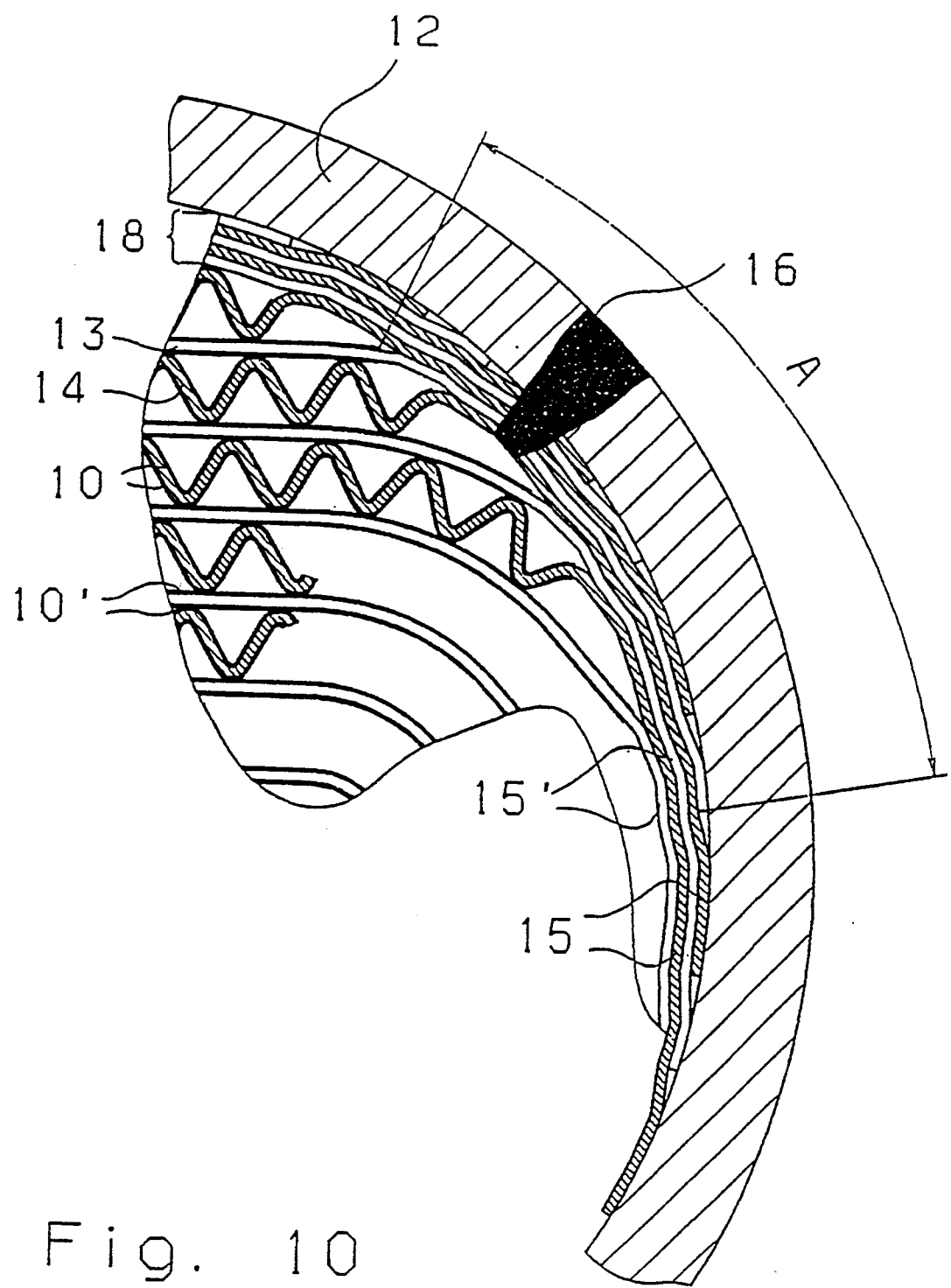
FIG. 10 is an enlarged, fragmentary view of a portion of FIG. 2 with coated sheets and uncoated, smooth end segments at the jacket.

FIG. 10 shows a portion of a metal carrier body that was produced by the method of the invention. In this case corrugated sheet metal layers 14 and smooth sheet metal layers 13 are provided with a coat, for instance a wash coat 10, 10' which was already applied previously to the individual sheet metal layers. Smooth end segments 15, 15' of the sheet metal layers 13, 14 are uncoated in a region A, which is equivalent to the length of the smooth end segments 15, 15' in this case. The smooth end segments 15, 15' are stacked to make an outer layer 18 that rests on a jacket 12. The jacket 12 and the outer layer 18 are joined by joining techniques through the use of a weld 16, which is possible only if the end segments are bright, clean or plain and uncoated.

We claim:

1. An apparatus for catalytically decontaminating exhaust gases, comprising:
   a metal carrier body having a periphery and having a plurality of sheet metal layers at least some of which are corrugated, said sheet metal layers having smooth end segments overlapping one another, said overlapping smooth end segments forming an outer layer on the periphery of said metal carrier body;
   a jacket encompassing said metal carrier body; and
   at least one weld seam connecting said smooth end segments to one another and to said jacket.

2. The apparatus according to claim 1, wherein said sheet metal layers are all corrugated.

3. The apparatus according to claim 1, wherein said sheet metal layers are smooth and corrugated layers.

4. The apparatus according to claim 1, wherein said outer layer is between 0.5 mm and 2 mm thick.

5. The apparatus according to claim 1, wherein said at least one weld seam is a laser weld seam.

6. The apparatus according to claim 1, wherein said outer layer of said metal carrier body has an end surface on which said jacket is welded.

7. The apparatus according to claim 1, wherein said outer layer has end surfaces which form a collar rim and said collar rim is welded to said jacket.

8. The apparatus according to claim 1, wherein said sheet metal layers are coated with a wash coat, except for said overlapping smooth end segments.

9. An apparatus for catalytically decontaminating exhaust gases, comprising:
   a metal carrier body having a periphery and having a plurality of sheet metal layers at least some of which are corrugated, said sheet metal layers having smooth end segments overlapping one another, said overlapping smooth end segments forming an outer layer on the periphery of said metal carrier body, said outer layer having an end surface;
   a jacket encompassing said metal carrier body; and
   mechanical retaining means securing said metal carrier body in an axial direction of said carrier body in said jacket and engaging the end surface of said outer layer.

10. The apparatus according to claim 9, wherein said metal carrier body is secured in form-locking connection in said jacket by said mechanical retaining means.

11. The apparatus according to claim 10, wherein said sheet metal layers are all corrugated.

12. The apparatus according to claim 10, wherein said sheet metal layers are smooth and corrugated layers.

* * * * *